United States Patent [19]

Giorgio

[11] Patent Number: 5,119,077
[45] Date of Patent: Jun. 2, 1992

[54] INTERACTIVE BALLISTIC TRACKING APPARATUS

[76] Inventor: Paul J. Giorgio, 285 River Ave., Providence, R.I. 02908

[21] Appl. No.: 363,246

[22] Filed: Jun. 5, 1989

Related U.S. Application Data

[63] Continuation-in-part of Ser. No. 146,743, Jan. 15, 1988, Pat. No. 4,908,791, and Ser. No. 146,744, Jan. 15, 1988, Pat. No. 4,912,672.

[51] Int. Cl.⁵ .............................................. G09G 1/00
[52] U.S. Cl. ..................... 340/710; 364/DIG. 2; 364/929.12
[58] Field of Search ... 364/200 MS File, 900 MS File; 340/710

[56] References Cited

U.S. PATENT DOCUMENTS

| | | | |
|---|---|---|---|
| 4,857,903 | 8/1989 | Zalenski | 340/710 |
| 4,866,602 | 9/1989 | Hall | 340/710 |
| 4,906,843 | 3/1990 | Jones et al. | 340/710 X |
| 4,951,034 | 8/1990 | Mazzone et al. | 340/710 |
| 4,963,858 | 10/1990 | Chien | 340/710 |

*Primary Examiner*—Thomas M. Heckler
*Attorney, Agent, or Firm*—Michael J. McGowan; Prithvi C. Lall; Michael F. Oglo

[57] ABSTRACT

An improved computer mouse allows a computer operator to interactively adjust horizontal and vertical resolution by depressing switches on the mouse frame and moving the mouse frame on a flat surface. Optional indicators on the mouse frame indicate a plurality of resolution settings. An internal sounding device within the mouse assembly provides audio feedback as the resolution is changed. The invention connects to a standard Personal Computer (PC) through a serial RS-232 port or a standard parallel "bus mouse" interface and contains provisions for vendor unique interfaces. Keyboard entry is not required in order to adjust the resolution setting of the mouse. Memory resident dynamic tracking programs are not needed to modify the resolution of the mouse, thereby freeing up computer memory for other applications.

5 Claims, 2 Drawing Sheets

INTERACTIVE BALLISTIC TRACKING APPARATUS

STATEMENT OF GOVERNMENT INTEREST

The invention described herein may be manufactured and used by or for the Government of the United States of America for governmental purposes without the payment of any royalties thereon or therefor.

This application is a continuation-in-part of application Ser. No.146,743 filed Jan. 15, 1988, now U.S. Pat. No. 4,908,791 of Mar. 13, 1990 for Switch Display Encoder and application Ser. No. 146,744 filed Jan. 15, 1988, now U.S. Pat. No. 4,912,672 of Mar. 27, 1990 for Computer Peripheral Rate Aided Sensing System.

BACKGROUND OF THE INVENTION (1) Field of the Invention

The invention described herein relates to an improved computer mouse comprising a frame that houses a ball coupled to mechanical or optical encoders that, in combination, produce signals indicative of X (horizontal) and Y (vertical) movement as the frame is moved in any direction along a flat surface.

(2) Description of the Prior Art

Present day computer mouse assemblies provide an output signal in serial (RS-232) or parallel ("bus mouse") form to a computer for the purpose of moving a cursor along a display screen, selecting a menu, selecting an item within a menu, etc. These present day assemblies also incorporate a plurality of switches that output a specific code that the computer software interprets as an "escape", "enter", etc. In all prior art computer mouse assemblies, the resolution settings of the internal encoders are fixed; i.e., moving the frame in a given direction for a fixed distance always results in the same number of output pulses or dots per inch (dpi). This situation is particularly disadvantageous if a large computer monitor (normally a Cathode Ray Tube (CRT)) is used. A 100 dot per inch (dpi) mouse needs a surface area of 12 by 8 inches to cover a 1,200 by 800 pixel or "dot" resolution CRT monitor. Computer mouse manufacturers have attempted to overcome this deficiency by loading a software program into the computer's memory that allows an operator, by using the mouse and a keyboard, to modify the resolution of the mouse. This process is normally referred to as dynamic or ballistic tracking. These software adjustment programs normally require over 30,000 bytes of resident computer memory. Utilizing a resolution adjustment program when the computer is executing a word processing program, for example, would result in approximately fifteen fewer standard 8½ × 11 inch pages for the word processed text file.

Some manufacturers, such as Dexxa International, have devised a mouse resolution program that generates a tone using the computer's internal speaker to indicate the resolution setting of the mouse. This approach, like other prior art solutions, also requires the use to an internal memory resident dynamic tracking adjustment program and a keyboard for adjusting the mouse's X,Y resolution settings. Furthermore, if the computer is located very far from the operator, the audio tones may not be heard.

All prior art solutions utilizing a memory resident resolution adjustment program require that the operator depress keys on the computer keyboard, such as CTRL and ALT, in addition to depressing a key or keys on the mouse. This approach is particularly disadvantageous since it always requires keyboard entry. In addition to the above, a number of commercially available software programs operate totally on mouse generated data without the need for keyboard entries. However, these software programs do not provide for resolution adjustment.

U.S. patent applications Ser. No. 146,743 and Ser. No. 146,744, by the present inventor, filed concurrently on Jan. 15, 1988 describe a switch display encoder apparatus and rate aided sensing system for interactively adjusting and displaying encoder speed and resolution parameters. This type of computer mouse is particularly useful for Computer Aided Design (CAD) and Computer Aided Manufacturing (CAM) applications since it provides adjustment of resolution settings based on speed of the mouse. The principal disadvantage of this invention is that the computer mouse assembly must incorporate additional switches and numeric displays beyond the ones normally found on industry standard computer mouse assemblies. Mechanically integrating six switches with numeric displays would result in a significant increase in the overall size of the mouse assembly. Another disadvantage is that an operator must divert his/her attention from the computer screen to view the numerical displays on the mouse assembly indicating the newly adjusted resolution settings. This type of mouse assembly also requires a minimum of 60 signal connections to an external sensing system in order to function properly. Finally, this type of computer mouse may appear too inhibiting or sophisticated for a word processing operator or an individual who is not "computer literate".

SUMMARY OF THE INVENTION

An improved industry standard computer mouse comprising a frame, ball, switches, and optional indicators permits a computer operator to interactively adjust X,Y resolution settings without the need for additional switches, numerical displays, or computer memory resident adjustment programs.

The principal object of the invention resides in the provision of a new and novel means for adjusting the X and Y resolution of the mouse without the use of computer memory resident ballistic tracking programs, keyboards, or additional switches and displays.

It is an object of the present invention to allow an operator to adjust the X,Y resolution of the computer mouse by depressing the industry standard switches and moving the computer mouse frame. Industry nomenclature for adjusting the X,Y resolution of a computer mouse is normally referred to as dynamic or ballistic tracking. As the frame is moved in any direction while the switches are depressed an internal sounding device provides audio feedback indicative of resolution settings as the resolution is altered. Optional indicators, such as LED's, display the operator selected resolution setting.

Personal computer software programs sometimes require that one or two mouse switches be depressed in order to initialize a particular function. However, it is never required that the mouse be moved with all of its switches depressed in order to perform a specific function.

The present invention takes advantage of this situation by altering the mouse's X,Y resolution when all switches are depressed and the mouse is moving and by inhibiting all mouse outputs when the adjustment takes place.

According to the present invention, a computer operator depresses the switches on the computer mouse and moves the frame of the computer mouse, thereby adjusting the resolution of the X,Y encoders. As the frame is moved, an internal sounding device within the mouse assembly provides audio feedback to the operator indicative of X,Y resolution. Optional indicators, such as LED's, are illuminated indicating the resolution setting of the mouse. Adjustments are provided for very low resolution, low resolution, normal resolution, high resolution, and very high resolution. Each resolution setting provides a different "dpi" or dots per inch output.

A screw type sensitivity control is provided on the bottom of the frame of the computer mouse for establishing the minimum movement of the computer mouse that results in a change in X,Y resolution settings when all switches are depressed. All switch and encoder outputs are inhibited whenever a change is made in the resolution of the encoders. When the operator is satisfied with the resolution setting as indicated by the audio tone of the internal sounding device or the optional LED's, he/she then releases the switches on the computer mouse, thereby establishing the new dots per inch output that result for any movement of the computer mouse frame.

DESCRIPTION OF THE PREFERRED EMBODIMENT

The invention incorporates industry standard switches for inputting signals to a computer for menu selection, item selection within a menu, etc., while the computer is normally executing commercial software programs such as Lotus 123, DBASE, Wordstar, or the like.

Figure 1:
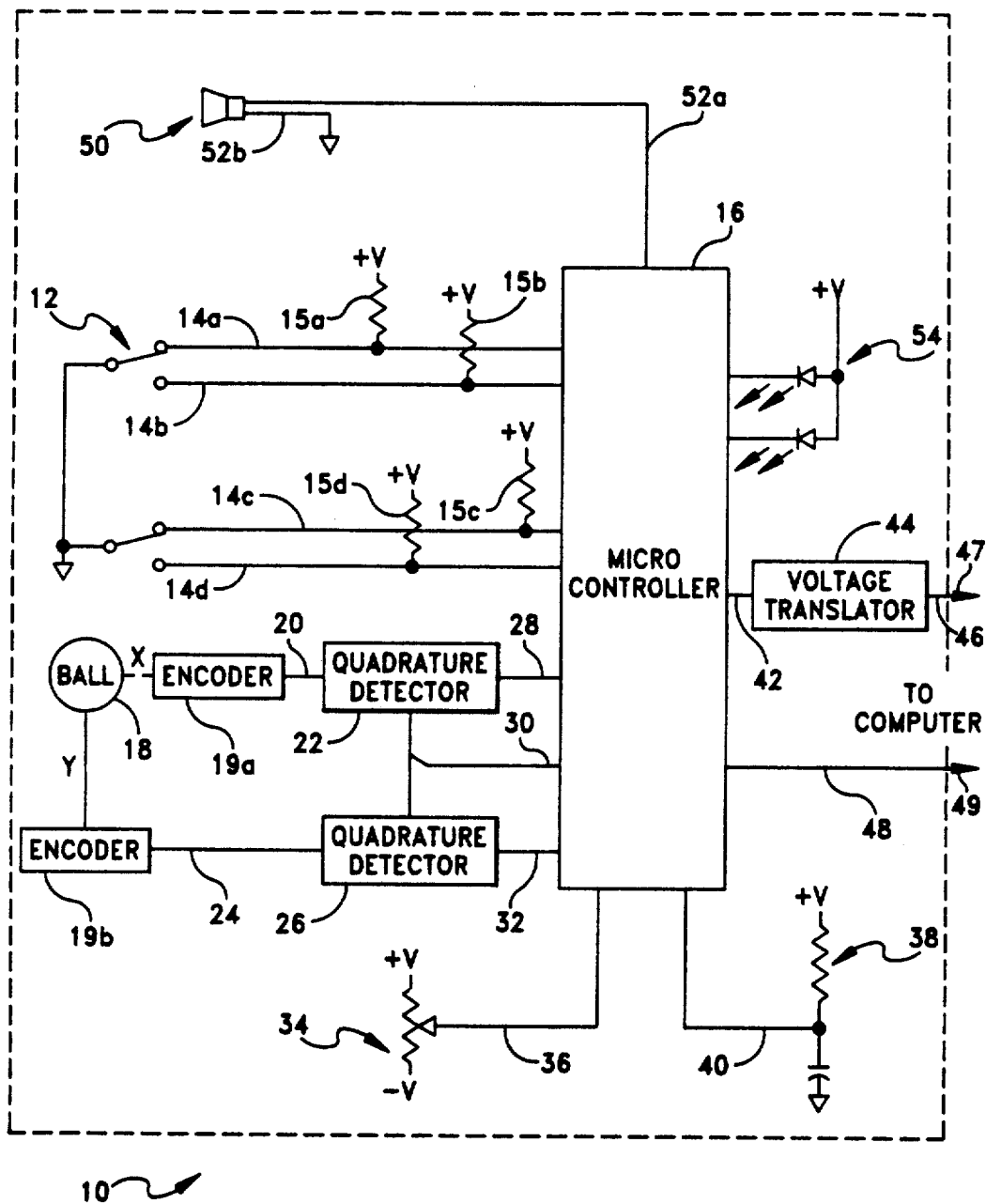
FIG. 1 is a block diagram of the computer mouse in accordance with the present invention.

Referring now to FIG. 1 there is shown a computer mouse assembly 10 comprising a switch assembly 12 connected by lines 14a, 14b, 14c, and 14d to a microcontroller 16. Pull-up resistors 15a, 15b, 15c, and 15d are used on respective switch lines 14A through 14D to provide a standard logic voltage level to microcontroller 16. A ball 18 is mechanically coupled to two optical or mechanical encoders 19a and 19b that produce output signals on respective lines 20 and 24 indicative of movement of the ball 18 in any one of four directions. The means of mechanically coupling the ball to two optical or mechanical encoders 19a and 19b is well known in the art. The output signals on lines 20 and 24 emanating from these encoders 19a and 19b are a result of the movement of ball 18. The signals are processed according to the flow chart shown in FIG. 2 while switches 12 are depressed. It is this processing that results in new and improved means for adjusting the X,Y resolution of mouse assembly 10.

The microcontroller 16 shown in FIG. 1 can be a standard off-the-shelf Motorola MC68HC11 microcontroller using internal eight bit data paths and sixteen bit address paths. Microcontroller 16 contains a central processing unit (CPU), input/output ports, one analog to digital (A/D) converter, one serial communications interface, 8K bytes of Read Only Memory (ROM), 512 bytes of electrically erasable programmable memory (EEPROM), 256 bytes of Random Access Memory (RAM), one sixteen bit internal free running timer, five output compare functions, and a real time interrupt circuit. This particular device contains all of the necessary hardware and software features to interface switches and encoder interfaces so as to construct a computer mouse with a serial RS-232 serial port and a parallel bus type port.

The other integrated circuits (IC's) within the mouse assembly 10 are the quadrature digital detectors 22 and 26 and voltage translator 44. A description of these devices follows.

Quadrature digital detectors 22 and 26 comprise off-the-shelf integrated circuits that accept two phase incremental encoder signals from encoders 19a and 19b, and convert these signals into a two's complement form suitable with shared data path microprocessor systems. Each quadrature detector incorporates an internal up-/down counter that counts the pulses from the respective encoder. When chip select lines 28 and 32 are alternately activated by microcontroller 16, the contents of the internal up/down counters are alternately placed on parallel lines 30 so that microcontroller 16 can load horizontal (X) information into one of its input/output registers and vertical (Y) information into another of its input/output registers. When chip select lines 28 and 32 are deactivated, the internal up/down counters are reset to zero and the output data lines 30 are placed in a high impedance state.

It should be noted that the use of quadrature digital detectors 22 and 26 off-loads microcontroller 16 from continuously reading the output from encoder lines 20 and 24. These integrated circuits are used only to disclose one preferred embodiment of the invention. Microcontroller 16 could, for example, continuously sample the encoder outputs lines 20 and 24 through its data bus or an I/0 port and process that data according to the sequence shown in FIG. 2 without the need for quadrature digital detectors 22 and 26.

Voltage translator 44 is a commercial off-the-shelf integrated circuit (IC) that converts signals on line 42 to a standard RS-232 voltage level for transmission to port 47 over line 46. Mouse assembly 10 when constructed as a serial mouse receives +V and −V voltages through port 47, and through port 49 if constructed as a "bus" mouse.

Sounding device 50 is any sounding device which can produce variable pitch sounds. Sounding device 50 interfaces to microcontroller 16 by means of signal line 52a and ground line 52b.

LED's 54 represent a plurality of light emitting diodes (LED's) or other indicating means for visually displaying the selected resolution setting. The LED's 54 are optional when constructing the mouse 10 since audio feedback representative of the selected resolution setting is provided from sounding device 50.

Potentiometer 34 is a variable resistor controlled by means of an adjustment screw located on the underside of mouse assembly 10. The purpose of potentiometer 34 is to adjust the sensitivity of the ballistic tracking within mouse 10. The adjusted analog voltage from potentiometer 34 is sent to microcontroller 16 by means of signal line 36. Microcontroller 16 converts the adjusted analog voltage to a digital representation and stores this value in one of its internal registers.

Resistor/capacitor network 38 produces a reset pulse on signal line 40 to microcontroller 16 when voltage is first applied to mouse assembly 10. Receipt of this reset pulse on line 40 initializes microcontroller 16.

The interface and operation of the various components in mouse assembly 10 are as follows.

When power is first applied to mouse assembly 10, resistor capacitor network 38 sends a reset pulse on line 40 to microcontroller 16 which initializes all internal control registers and commences normal processing, characteristic of the operational sequence of an industry standard mouse. There are many ways this normal sequence could be structured and, as previously stated, the technique for doing this is well known in the art. Some industry standard mouse assemblies output the ASCII representation of the letter "M" whenever power is applied to the mouse. Other mouse software programs may "interrogate" the parallel or serial port to determine if the mouse is connected.

Switch assembly 12 comprises two single pole double throw (SPDT) switches normally positioned as shown in FIG. 1. When both of these switches 12 are depressed, signal lines 14A and 14C change from ground voltage to a +v voltage and signal lines 14B and 14D change from a +v voltage to a ground voltage. All four signal lines 14A through 14D are input to four input lines of microcontroller 16 which senses the change in the voltage levels of these signals. The operational sequence shown in FIG. 2 commences whenever a change in any switch position (activate or deactivate) on switch assembly 12 is noted. This operational sequence can be adapted to any industry standard computer mouse operational sequence. It is this change in any switch position that initiates the operational sequence stored internally in ROM in microcontroller 16 and shown in FIG. 2.

Signals on lines 20 and 24 are output quadrature pulses sent from the respective mechanical or optical encoders 19a and 19b as a result of the rotation of ball 18. Quadrature detectors 22 and 26 accept these quadrature pulses, count the number of pulses in internal eight bit up/down counters, and store these counts internally. After an initial delay to insure that ball 18 has moved a sufficient distance, microcontroller 16 reads the value in quadrature detector 22 over signal lines 30 by dropping select line 28 to a logic level LOW. This situation results in microcontroller 16 reading the contents of the internal eight bit up/down counter in quadrature detector 22. When this read cycle is completed by microcontroller 16, the internal eight bit counter in quadrature detector 22 is reset to zero. This allows the next quadrature detector 22 to microcontroller 16 read cycle to read the incremental change in X (horizontal) position of ball 18 since the last read cycle. Microcontroller 16 then initiates a read cycle for quadrature detector 26 by dropping select line 32 to a logic level LOW. The value read during this read cycle represents the incremental change of ball 18 in the Y (vertical) direction.

Mouse 10 is shown with a serial RS-232 I/0 port 47 and a parallel I/0 port 49. Normally, a mouse is constructed with only one of these two interface ports. Both the RS-232 I/0 port 47 and the parallel I/0 port 49 are shown in FIG. 1 so that an individual with ordinary skill in the art could construct either a RS-232 mouse or a bus (parallel) type mouse from the disclosed embodiment. The serial RS-232 I/0 port 47 normally connects to one of the two "COM" serial ports of a standard Personal Computer (PC). The parallel I/0 port 49 normally connects to a circuit card located within the PC that interfaces to the PC's internal bus.

Figure 2:
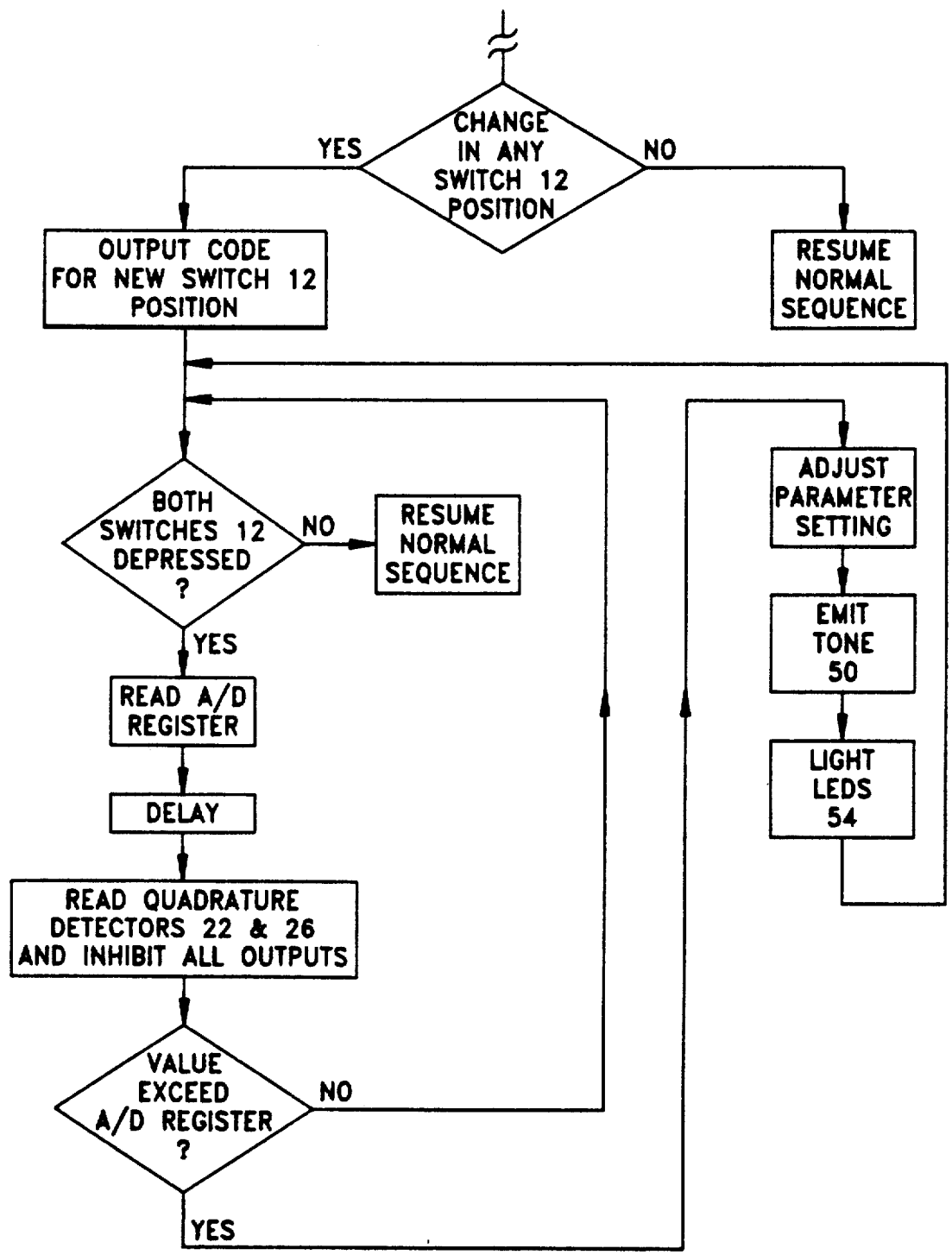
FIG. 2 is a flow chart of the operation of the Read Only Memory (ROM) embedded in microcontroller 16 shown in the block diagram of FIG. 1.

Refer additionally to FIG. 2 for a flow chart depicting the operational sequence embedded in ROM in microcontroller 16 when an adjustment is made to the horizontal and vertical resolution of mouse 10.

This operational sequence begins when any change in switch position 12 is noted by microcontroller 16. This sequence will initialize as a result of an interrupt or exception to the normal flow of processing. The normal operational sequence that microcontroller 16 follows when mouse 10 is outputting switch and/or encoder data is well documented by the prior art and is neither disclosed nor claimed in this embodiment.

Whenever a change in switch 12 position is noted, microprocessor 16 outputs the code representative of the new switch position or switch positions through serial I/0 47 or parallel I/0 49. Microcontroller 16 next verifies if both switches 12 are depressed. If not, microcontroller 16 resumes its normal operational sequence and mouse 10 functions as an industry standard computer mouse. However, if both switches 12 are depressed, microcontroller 16 will read a digital number represented by an A/D register (analog to digital converter) internal to microcontroller 16. The value of this register is a digital number determinative of the setting of an adjustment screw mechanically coupled to potentiometer 34. This digital number, which can be adjusted by the operator by turning a screw mounted under the mouse frame, is used to determine the minimum movement (i.e., distance) that mouse 10 is required to move when both switches 12 are depressed in order to alter its horizontal and vertical resolution.

Continuing through the sequence shown in FIG. 2, microcontroller 16 next executes a delay or time out sequence, then reads the values of horizontal and vertical quadrature digital detectors 22 and 26. This time out sequence of substantially 0.5 seconds is necessary in order to give the operator sufficient time to move the mouse assembly 10 while both switches 12 are depressed. If this time out sequence were not inserted, microcontroller 16 would read detectors 22 and 26 within microseconds after both switches in switch assembly 12 are depressed. Obviously, such a short time would not result in any appreciable digital value in detectors 22 and 26.

Microcontroller 16 next inhibits all outputs resulting from the movement of ball 18 when both switches 12 are depressed and verifies if either of the values read from detectors 22 and 26 exceed the value of the internal A/D register. If neither value is greater, microcontroller 16 checks again if both switches 12 are depressed. If this condition is false (NO), microcontroller 16 resumes its normal processing. Since both switches 12 were both initially depressed, a change in switch position has occurred. This condition results in microcontroller 16 beginning the sequence shown in FIG. 2 and outputting the code representative of the new switch 12 position or positions through serial I/0 47 or parallel I/0 49.

If either value read from detectors 22 and 26 is greater than the value read from the internal A/D register, microcontroller 16 selects the next dynamic tracking parameter and stores this parameter in internal RAM. This value is used to alter the physical resolution (i.e., "dpi") of the mouse assembly when the mouse is executing its "normal" operational sequence.

Microcontroller 16 next emits a tone from sounding device 50 representative of the parameter value selected. Microprocessor can also light one of the LED's 54, visually displaying the parameter value selected. Sounding device 50 is energized from microprocessor 16 through signal line 52a and signal ground line 52b. Signal line 52 can be any one of the programmable output port on microcontroller 16. Likewise, LED's 54 are illuminated from another of the programmable output ports on microcontroller 16. The tone could sound for a few seconds indicating the new parameter value selected. Likewise, the optional LED's could illuminate for a few seconds or remain continuously lighted.

After the parameter value is adjusted, microcontroller 16 again checks if both switches 12 are still depressed. If this condition does not exist (NO), microcontroller 16 resumes its normal operational sequence. If this condition exists (YES), the sequence following "BOTH SWITCHES 12 DEPRESSED" shown in FIG. 2 begins again. If mouse 10 continues to move a "second" distance greater than the value of the internal A/D register when switches 12 are depressed, microcontroller 16 selects the next dynamic tracking parameter and updates the value previously stored in internal RAM. If both switches 12 are depressed and mouse 10 is stationary or moves a distance less than the value stored by the internal A/D register, no change to the parameter settings are made. As long as switches 12 are depressed and mouse 10 continues to move a distance greater than the value of the internal A/D register, resolution adjustments are continuously made. The sequence would start with normal resolution, followed by high resolution, followed by very high resolution, followed by very low resolution, followed by low resolution, followed by normal resolution, etc. For each change in resolution setting, an internal sounding device 50 emits a tone determinative of the resolution setting chosen. The frequency of this tone could be selected so that a very low frequency corresponds to a very low resolution, a low tone corresponds to a low resolution, a higher tone corresponds to a normal resolution, etc. Optional LED indicators 54 can also provide a visual indication of the parameter value selected. Whenever the operator is satisfied with the resolution setting chosen by listening to the emitted tone (or watching the optional LED's) he/she can then release switches 12, and the last parameter stored in internal RAM is used to alter the resolution setting of the mouse during normal operation. Releasing either or both switches 12 results in microcontroller 16 exiting from the continuous loop that reads the A/D register and verifies if either detector 22 or 26 contains a value greater than the value of the internal A/D register. The microcontroller 16 would then follow its normal operational sequence.

Other programming embodiments are possible for adjusting resolution parameters. Microcontroller 16 can be programmed, for example, so that "negative" movements ($-X$ and/or $-Y$) would result in sequences that take the following form: normal resolution, low resolution, very low resolution, very high resolution, etc. Furthermore, the operational sequence is not limited to the adjustments previously stated. Theoretically, an infinite number of adjustments are possible. Additionally, the preferred embodiment, as disclosed, utilizes a two switch computer mouse. Other embodiments are possible utilizing a different number of switches.

The description of the preferred embodiment utilizes an off-the shelf microcontroller 16. The advantage to using an off-the-shelf microcontroller 16 as opposed to an off-the-shelf microprocessor, for example, is that the entire processing system is packaged in one integrated circuit (I.C.) without the need for external support Read Only Memory (ROM) Random Access Memory (RAM), or A/D conversion. Utilizing an off-the-shelf microcontroller also allows all circuitry and operational sequences to be integrated within the mechanical dimensions of a "standard" size computer mouse. Other embodiments utilizing state-of-the-art integrated circuit (IC) technology, for example, would be the fabrication and utilization of an application specific integrated circuit (ASIC) that contains the required circuitry and performs the same operational sequence outlined in FIG. 2. This type of embodiment would further reduce the size or required "real estate" for the mouse's internal electronics.

It should be noted that some computer manufacturers have proposed a separate mouse I/0 port on their computers so as not to use one of the two standard "COM" serial ports (for a serial mouse) or an internal expansion board slot (for a parallel bus mouse). Microcontroller 16 contains sufficient I/0 capabilities to meet the needs of any special vendor unique interface requirements and the processing sequence depicted in FIG. 2 can be applied to any mouse regardless of its electrical interface.

It will be understood that many additional changes in the details, materials, steps, and arrangement of parts, which have been herein described and illustrated in order to explain the nature of the invention, may be made by those skilled in the art within the principle and scope of the invention as expressed in the appended claims.

What is claimed is:

1. A computer mouse comprising:
   movement means for changing the X and Y position of the computer mouse;
   encoder means, disposed within said mouse, for generating signals indicative of X and Y positional change;
   switching means, integral with said mouse, for permitting resolution scaling of said encoder means generated signals upon actuation of said switching means in conjunction with said X and Y position change produced by said movement means; and
   controller means, disposed within said mouse and connected to said encoder means and to said switching means, for receiving and providing resolution scaling of said encoder means generated signals, said controller means further including, detecting means for detecting operation of said switching means, analog to digital converter mans, said analog to digital converter means producing and storing an output digital word representative of a preset input analog signal, reading means for reading said digital word from said analog to digital converter means, said reading means further comprising means for reading said generated signals from said encoder means over a predetermined period of time, comparing means for comparing the value of said output digital word from said analog to digital converter means with said generated signals from said encoder means over a predetermined period of time, and scaling means for scaling said encoder means generated signals to produce signals with a new resolution when the value from reading the encoder means over a predetermined period of the exceeds the value from reading the output digital word from said analog to digital converter means.

2. A computer mouse according to claim 1 further comprising:
sounding means, connected to said controller means, said sounding means receiving signals from said controller means, for generating sound indicative of said new resolution; and
indicating means, connected to said controller means, said indicating means receiving signals from said controller means, for displaying a visual signal indicative of said new resolution.

3. A computer mouse comprising:
movement means for changing the X and Y position of the computer mouse;
encoder means for generating signals indicative of X and Y positional change; and
controller means, integrated within said mouse, for receiving and resolution scaling said encoder means generated signals to produce signals with a new resolution if said encoder means generated signals exceed a predetermined number over a fixed period of time.

4. A computer mouse according to claim 3 further comprising switching means integrated within said mouse, for initiating said controller means and for permitting said resolution scaling of said encoder means signals indicative of said X and Y positional change.

5. A computer mouse according to claim 4 further comprising:
sounding mans, connected to said controller means, said sounding means receiving signals from said controller means, for generating a sound upon said resolution scaling of said encoder means generated signals; and
indicating means, connected to said controller means, said indicating means receiving signals from said controller means, for displaying a visual signal upon said resolution scaling of said encoder means generated signals.

* * * * *